United States Patent
Yawata et al.

(10) Patent No.: US 8,765,277 B2
(45) Date of Patent: Jul. 1, 2014

(54) ELECTROCHEMICAL DEVICE AND PACKAGING STRUCTURE THEREOF

(75) Inventors: Kazushi Yawata, Takasaki (JP); Motoki Kobayashi, Takasaki (JP); Katsuei Ishida, Takasaki (JP); Naoto Hagiwara, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 310 days.

(21) Appl. No.: 12/990,633

(22) PCT Filed: May 7, 2009

(86) PCT No.: PCT/JP2009/058958
§ 371 (c)(1),
(2), (4) Date: Nov. 1, 2010

(87) PCT Pub. No.: WO2009/136660
PCT Pub. Date: Nov. 12, 2009

(65) Prior Publication Data
US 2011/0045327 A1    Feb. 24, 2011

(30) Foreign Application Priority Data
May 8, 2008   (JP) .................................. 2008-122314

(51) Int. Cl.
*H01M 2/12* (2006.01)
*H01M 2/30* (2006.01)

(52) U.S. Cl.
USPC ............. 429/82; 429/120; 429/162; 429/163; 429/177; 429/178; 429/179

(58) Field of Classification Search
None
See application file for complete search history.

(56) References Cited

U.S. PATENT DOCUMENTS

| | | | |
|---|---|---|---|
| 6,175,086 B1 * | 1/2001 | Nakamura | 174/261 |
| 6,324,049 B1 | 11/2001 | Inagawa et al. | |
| 2006/0044738 A1 * | 3/2006 | Miyaishi et al. | 361/600 |
| 2006/0068278 A1 | 3/2006 | Bloom et al. | |
| 2008/0096072 A1 * | 4/2008 | Fukusako et al. | 429/26 |
| 2008/0254348 A1 * | 10/2008 | Hatta et al. | 429/94 |

FOREIGN PATENT DOCUMENTS

| | | |
|---|---|---|
| CN | 1745438 A | 3/2006 |
| CN | 101096273 A | 1/2008 |
| JP | H10-172866 A | 6/1998 |
| JP | 2000-182579 A | 6/2000 |
| JP | 2000-200587 A | 7/2000 |
| JP | 2000-286171 A | 10/2000 |

(Continued)

OTHER PUBLICATIONS

Notice of Reasons for Refusal issued by Korean Patent Office, mailed Jan. 3, 2012, in the Korean counterpart application.
Notification of Reasons for Refusal issued by Chinese Patent Office, mailed Sep. 20, 2012, for Chinese counterpart application No. 200980121728.7.
Notification of First Office Action issued by Chinese Patent Office, mailed Jan. 30, 2012, for Chinese counterpart application No. 200980121728.7.

(Continued)

*Primary Examiner* — Alix Echelmeyer
(74) *Attorney, Agent, or Firm* — Law Office of Katsuhiro Arai

(57) ABSTRACT

Provided is an electrochemical device which is compatible with high-temperature reflow soldering using lead-free solder. An electric double-layer capacitor 10-1 has a structure in which a positive terminal 12 and a negative terminal 13 are led out of a package 14 where an electric storage element 11 is sealed. The entire package 14 and the bases of led-out portions of the positive terminal 12 and the negative terminal 13 are covered by a thermal insulation material layer 16 having a thermal conductivity lower than that of the package 14.

7 Claims, 8 Drawing Sheets

(56) References Cited

FOREIGN PATENT DOCUMENTS

| JP | 2000286171 A | 10/2000 |
|---|---|---|
| JP | 2001-167987 A1 | 6/2001 |
| JP | 2004-186502 A | 7/2004 |
| JP | 2005-353894 A | 12/2005 |
| JP | 2005353894 A | 12/2005 |

OTHER PUBLICATIONS

Notification of Reasons for Refusal issued by the Japanese Patent Office, mailed Jan. 24, 2013, for Japanese counterpart application No. 2010-511094.

A Notification of Reasons for Refusal issued by the Japanese Patent Office, mailed Nov. 27, 2013, for Japanese counterpart application No. 2013-057479.

* cited by examiner

ELECTROCHEMICAL DEVICE AND PACKAGING STRUCTURE THEREOF

This application is the U.S. National Phase under 35 U.S.C. §371 of International Application PCT/JP2009/058958, filed May 7, 2009, which claims priority to Japanese Patent Application No. 2008-122314, filed May 8, 2008. The International Application was published under PCT Article 21(2) in a language other than English.

TECHNICAL FIELD

The present invention relates to an electrochemical device which is provided with a structure in which at least a pair of terminals is led out of a package where an electric storage element is sealed, and a packaging structure for the electrochemical device in which the electrochemical device is mounted on a substrate.

BACKGROUND ART

Among electrochemical devices, such as electric double-layer capacitors, lithium ion capacitors, redox capacitors, lithium ion batteries and the like, there exists one which is provided with a structure in which at least a pair of terminals is led out of a package where an electric storage element is sealed.

For example, an electric double-layer capacitor as mentioned above is provided with a structure in which an electric storage element which is composed of positive electrodes and negative electrodes stacked in sequence with separators being interposed therebetween, one end of a positive terminal which is electrically connected to the positive electrodes of the electric storage element, one end of a negative terminal which is electrically connected to the negative electrodes of the electric storage element, and an electrolyte solution are sealed in a package, while the other end of the positive terminal and the other end of the negative terminal are led out of the package. The package is formed of a laminated film having, for example, a plastic protective layer, a metal barrier layer and a plastic heat seal layer in sequence. The package is formed, for example, by bending and folding over a sheet of rectangular film of a predetermined size, and then heat sealing the three sides thereof (at the overlaid portion of the heat seal layer).

As recent electrochemical devices including the above exemplified electric double-layer capacitor have been reduced in size, the electrochemical devices are desired to be mounted on a substrate or the like with high-temperature reflow soldering using lead-free solder, in the same manner as general electronic components are mounted. In other words, the need for electrochemical devices which are compatible with high-temperature reflow soldering using lead-free solder has increased.

However, the conventional electrochemical devices are not compatible with high-temperature reflow soldering using lead-free solder, therefore it is difficult to meet the need for mounting the electrochemical devices on a substrate or the like with high-temperature reflow soldering using lead-free solder, in the same manner as general electronic components are mounted.

The furnace temperature in a reflow furnace used for reflow soldering using lead-free solder reaches a maximum of approximately 250° C., for example. As a result, when a conventional electrochemical device is placed in the reflow furnace to perform reflow soldering, heat flows through and enters the package which is directly exposed to a furnace atmosphere of the reflow furnace. Then, heat may cause a failure such as heat-deterioration of the electric storage element in the package, and significant reduction of the electrical properties of the electrochemical device or the like.

Patent Document 1 discloses a structure in which an electrochemical device is housed in a casing; however, the casing is not adapted to actively suppress heat from being transferred to the package, therefore a failure similar to that described above may occur.

Patent Document 1: Japanese Patent Laid-open No. 2000-286171

DISCLOSURE OF INVENTION

Problems to be Solved by the Invention

The present invention provides an electrochemical device which is compatible with high-temperature reflow soldering using lead-free solder and a packaging structure for the electrochemical device in which the electrochemical device is mounted on a substrate.

Means for Solving the Problems

To meet the above objectives, the present invention provides an electrochemical device which is mounted by soldering, which includes a package, an electric storage element which is sealed into the package, at least a pair of terminals, each having one end which is electrically connected to the electric storage element and another end which is led out of the package, and heat transfer suppressing means which covers the entire package and the bases of led-out portions of the terminals so as to suppress heat transfer from the outside to the package.

In this electrochemical device and a packaging structure thereof, the heat transfer suppressing means which covers the entire package can suppress heat transfer to the package during reflow soldering and reduce the amount of heat which flows through the package into the inside of the package. Therefore, it is possible with certainty to prevent a failure such as heat-deterioration of the electric storage element caused by heat which has entered the package, and significant reduction of the electrical properties of the electrochemical device or the like. This makes it possible with certainty to meet the need for mounting the electrochemical devices on a substrate or the like with high-temperature reflow soldering using lead-free solder, in the same manner as general electronic components are mounted.

Advantages

In the present invention, an electrochemical device which is compatible with high-temperature reflow soldering using lead-free solder and a packaging structure for the electrochemical device in which the electrochemical device is mounted on a substrate can be provided.

The above and other objectives, configuration features and advantages of the present invention will be apparent from the following description and attached drawings.

Figure 1:
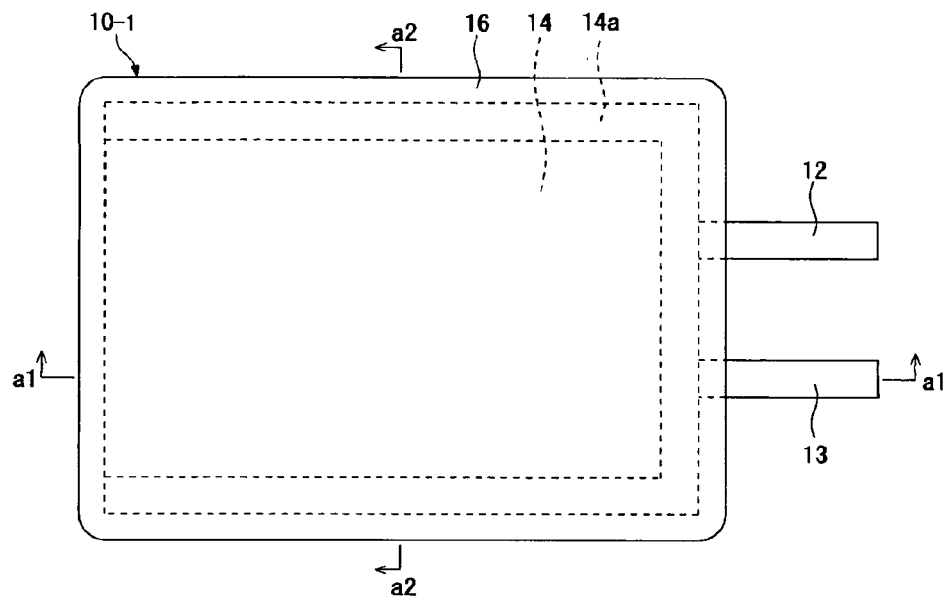
FIG. 1 is a top view of an electric double-layer capacitor in a first embodiment in which the present invention is applied to the electric double-layer capacitor.

DESCRIPTION OF REFERENCE NUMERALS 10-1, 10-2, 10-3, 10-4, 10-5 electric double-layer capacitor
11 electric storage element
12 positive terminal
13 negative terminal
14 package
15 electrolyte solution
16 thermal insulation material layer
17 cover sheet
17b air discharge hole
18 deformation-suppressing member
19 cover sheet
20 air layer
SU substrate
LA land
SO solder

BEST MODES FOR CARRYING OUT THE INVENTION

Embodiment 1

Figure 2:
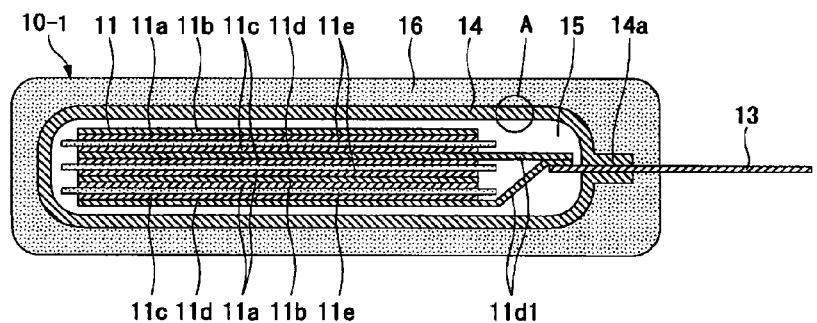
FIG. 2 is a longitudinal sectional view taken along the line a1-a1 of FIG. 1.
Figure 3:
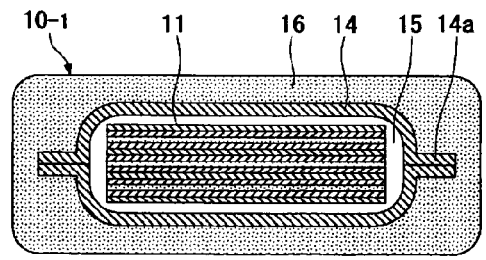
FIG. 3 is a longitudinal sectional view taken along the line a2-a2 of FIG. 1.
Figure 4:
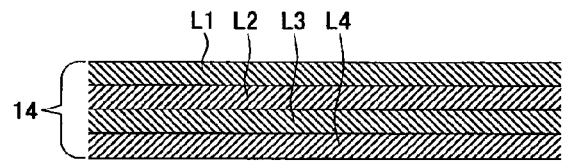
FIG. 4 is a detailed view of portion A of FIG. 2.
Figure 5:
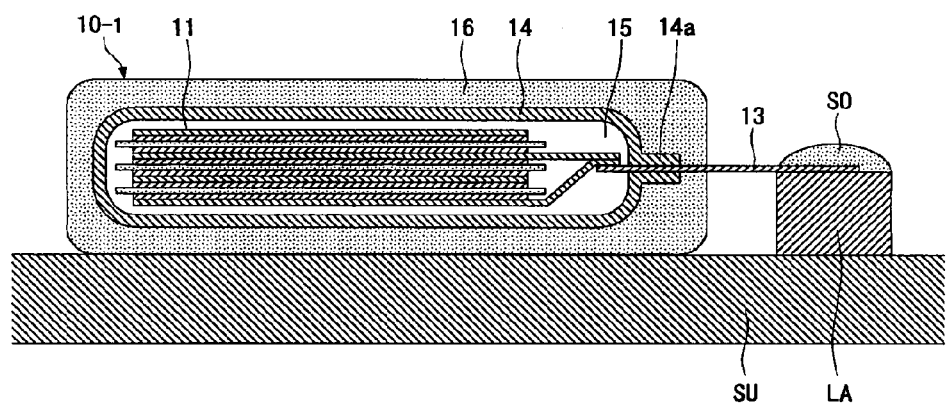
FIG. 5 shows a packaging structure in which the electric double-layer capacitor illustrated in FIGS. 1 to 4 is mounted on a substrate.

FIGS. 1 to 5 show a first embodiment in which the present invention is applied to an electric double-layer capacitor. FIG. 1 shows a top view of the electric double-layer capacitor; FIG. 2 shows a longitudinal sectional view taken along the line a1-a1 of FIG. 1; FIG. 3 shows a longitudinal sectional view taken along the line a2-a2 of FIG. 1; FIG. 4 shows a detailed view of portion A of FIG. 2; and FIG. 5 shows a packaging structure in which the electric double-layer capacitor illustrated in FIGS. 1 to 4 is mounted on a substrate.

An electric double-layer capacitor 10-1 of the first embodiment of the present invention includes an electric storage element 11, a pair of terminals (a positive terminal 12 and a negative terminal 13), a package 14, an electrolyte solution 15, and a thermal insulation material layer 16.

The electric storage element 11 is composed of positive electrodes (not labeled in the figure) and negative electrodes (not labeled in the figure) which are alternately stacked with separators 11e being interposed therebetween. Each positive electrode is composed of a positive polarizable electrode 11a and a positive current collector 11b which overlies the positive polarizable electrode 11a, while each negative electrode (not labeled in the figure) is composed of a negative polarizable electrode 11c and a negative current collector 11d which overlies the negative polarizable electrode 11c. Further, a connecting piece 11b1 (not shown in the figure) is provided at the end of each positive current collector 11b. Similarly, a connecting piece 11d1 is provided at the end of each negative current collector 11d.

For the purpose of convenient illustration, FIG. 2 shows a configuration in which substantially three units are stacked, with each unit being composed of a positive electrode, a negative electrode and a separator 11e. However, four or more units, or alternatively, one unit may be used in the configuration. Further, although current collectors 11b and 11d are disposed on the uppermost and lowermost layers of the electric storage element 11, respectively, a polarizable electrode or a separator may be further disposed on the outer sides of the uppermost and lowermost layers in accordance with the manufacturing process or the like.

The positive terminal 12 and the negative terminal 13 are both formed of a metal such as aluminum in a strip shape. The positive terminal 12 has one end which is electrically connected to the connecting piece 11b1 of the electric storage element 11, while the negative terminal 13 has one end which is electrically connected to the connecting piece 11d1 of the electric storage element 11.

The package 14 is formed of a film which has a heat seal layer at least on one side thereof. As can be seen in FIG. 2, the electric storage element 11, one end of the positive terminal 12, one end of the negative terminal 13 and the electrolyte solution 15 are sealed in the package 14, while the other end of the positive terminal 12 and the other end of the negative terminal 13 are led out of the package 14. For sealing of the electrolyte solution 15, in addition to a method of impregnating the electric storage element 11 with the electrolyte solution 15 prior to forming the package 14, a method of filling the package 14 with the electrolyte solution 15 after the package 14 is formed via an opening preformed on the package 14 and then closing the opening and so on may be used.

As a film for forming the package 14, a laminated film may be preferably used as shown in FIG. 4, wherein the laminated film includes, for example, a protective layer L1 formed of a plastic such as nylon, a barrier layer L2 formed of a metal such as aluminum or a metal oxide such as $Al_2O_3$, an insulative layer L3 formed of a plastic such as polyethylene terephthalate, and a heat seal layer L4 formed of a plastic such as polypropylene in sequence. The barrier layer L2 in this laminated film serves to prevent the electrolyte solution 15 from leaking out of the package 14, prevent water from entering the package 14 or the like. In addition, the insulative layer L3 serves to prevent the barrier layer L2 from coming into contact with the electric storage element 11 even when the heat seal layer L4 is melted by heat sealing. Note that as the film for forming the package 14, a laminated film or a non-laminated film may be used with at least one of the protective layer L1, the barrier layer L2 and the insulative layer L3 being removed from the laminated film shown in FIG. 4.

Further, as a method of forming the package 14 from a laminated film or a non-laminated film, for example, (E11) a method of bending and folding over a sheet of rectangular film of a predetermined size, and then heat sealing the three sides thereof (at the overlaid portion in the heat seal layer) (see FIG. 1 and a heat sealed portion 14a in FIG. 1), (E12) a method of overlaying two sheets of a rectangular film of a predetermined size with each other, and then heat sealing the four sides thereof (at the overlaid portion in the heat seal layer) or other methods may be preferably used.

The thermal insulation material layer 16 has a thermal conductivity lower than that of the package 14, and is made of a material having heat resistance to prevent changes in properties or the like when directly exposed to the furnace atmosphere in the reflow furnace during reflow soldering and heated to a specific temperature (for example, approximately 250° C.). As can be seen in FIG. 2, the thermal insulation material layer 16 covers the entire package 14 and the bases of led-out portions of the positive terminal 12 and the negative terminal 13, with the tips of the positive terminal 12 and the negative terminal 13 extending from the thermal insulation material layer 16 to the outside.

As a material for forming the thermal insulation material layer 16, for example, (E21) a porous glass such as silica aerogel, Vycor glass, or fumed silica; (E22) a porous aluminum such as anodized aluminum or powdered cement paste; (E23) graphite foam; and (E24) a porous plastic such as porous fluororesin or polyimide foam may be preferably used. These materials are essentially porous materials which include a number of internal pores communicating each other; however, as long it has the above described thermal insulation and heat resistance properties, a material which includes a number of internal pores not communicating with each other may also be used.

Further, as a method of forming the thermal insulation material layer 16 so as to cover the entire package 14 and the bases of led-out portions of the positive terminal 12 and the negative terminal 13, for example, (E31) a method of providing a mold having a rectangular cavity (not shown in the figure), inserting the package 14 into the cavity with the tips of led-out portions of the positive terminal 12 and the negative terminal 13 extending therein, injecting a flowable material into the cavity and curing the material, and removing the package 14 from the mold after curing may be preferably used. Further, (E32) a method of winding a sheet of material on the surface of the package 14 using a material which has been processed into a sheet shape, and then joining the wound end portions using an adhesive or the like, (E33) a method of winding a sheet of material on the surface of the package 14 and adhering the sheet-shaped material to the package 14 using an adhesive, using a material which has been processed into a sheet shape, or other methods may be preferably used.

Further, the thermal insulation material layer 16 preferably has as small a thickness as possible, so as not to increase the size of the electric double-layer capacitor 10, in other words, so as to be of a size similar to general electronic components that can be mounted on the substrate or the like. The thickness t of the thermal insulation material layer 16 will be described below by way of specific examples.

Here, the electric double-layer capacitor has an interface between a space in the package where the electric storage element is sealed and the inner surface of the laminated film, the dimensions of which are, for example, 30 mm in length× 17 mm in width×2 planes, wherein the laminated film has a thickness of 0.3 mm. Further, each of two terminals led out of the package 14 has dimensions of, for example, 0.3 mm in thickness×5.0 mm in width×5.0 mm in length. In the calculation described below, a temperature difference of 260° C. is assumed between the inside and outside of the package 14.

First, when the previous electric double-layer capacitor without the thermal insulation material 16 is mounted on the substrate or the like by reflow soldering using lead-free solder, it is assumed that, for example, the amount of heat which flows through and into the package is 266 W, while the amount of heat which flows through the positive terminal and the negative terminal into the package is 38 W. On the basis of the above assumption, the following describes an approach to reduce the former amount of heat to the same extent as the latter amount of heat by means of the thermal insulation material layer 16 in the electric double-layer-capacitor 10-1.

When $\kappa p$ (W/m·K) represents the thermal conductivity of the thermal insulation material layer 16 of the electric double-layer capacitor 10-1, p represents the volume porosity, and $\kappa b$ (W/m·K) represents the thermal conductivity of the typical non-porous thermal insulation material, an expression $\kappa p < \kappa b \cdot (1-p)$ is obtained.

In order to reduce the amount of heat based on the above expression, a relational expression $\kappa p \cdot (1-p)/t < 4.78 \times 10^{-3}$ (W/$m^2$K) will be required. In this relational expression, t represents the thickness of the thermal insulation material layer 16, and $\kappa b$ represents the thermal conductivity of the general non-porous thermal insulation material, which is approximately 0.1. Further, in this relational expression, $4.78 \times 10^{-3}$ is a value calculated from the relationship between the amount of heat which flows through and into the package (266 W) and the amount of heat which flows through the positive terminal and the negative terminal into the package (38 W).

Therefore, in order to reduce the amount of heat which flows into the package, without increasing the size of, for example, the electric double-layer capacitor 10-1 due to the presence of the thermal insulation material layer 16, the thickness of the thermal insulation material layer 16 will be for example 0.1 mm, by using the thermal insulation material layer 16 having a volume porosity p higher than 0.859.

Next, an example of the method for mounting the electric double-layer capacitor 10-1 on the substrate SU by high temperature reflow soldering using lead-free solder will be described below.

When mounting the electric double-layer capacitor 10-1 on the substrate SU, as shown in FIG. 5, each of the tips of the positive terminal 12 and the negative terminal 13 extending from the thermal insulation material layer 16 is arranged on the corresponding land LA on the substrate SU using solder paste (SO), while the thermal insulation material layer 16 is arranged on the substrate SU.

FIG. 5 shows that the underside surfaces of tips of the positive terminal 12 and the negative terminal 13 are both located at almost the same height as the top surfaces of the respective lands LA, while the thermal insulation material layer 16 is arranged on the substrate SU. However, if the underside surfaces of tips of the positive terminal 12 and the negative terminal 13 and the top surfaces of the respective lands LA are located at different heights, the tips of the positive terminal 12 and the tips of the negative terminal 13 have their heights adjusted by bending their tips as appropriate before placement.

Next, the substrate SU on which the electric double-layer capacitor 10-1 is arranged is placed in the reflow furnace. The soldering points (at the tips of the positive terminal 12 and the negative terminal 13) are directly exposed to the furnace atmosphere in the reflow furnace in the course of passing therethrough and heated to a specific temperature (for example, approximately 250° C.), so that the tips of the positive terminal 12 and the negative terminal 13 are connected to the respective lands LA through the solder SO.

Although the thermal insulation material layer 16 is directly exposed to the furnace atmosphere in the reflow furnace in the course of passing through the reflow furnace and heated to a specific temperature (for example, approximately 250° C.), the heat conduction to the package 14 is suppressed due to the thermal insulation effect of the thermal insulation material layer 16 which covers the entire package 14, resulting in the amount of heat which flows through and into the package 14 being reduced. Also, since the thermal insulation material layer 16 covers the bases of led-out portions of the positive terminal 12 and the negative terminal 13, the amount of heat which flows through the positive terminal 12 and the negative terminal 13 into the package 14 is further reduced to some extent. Therefore, this makes it possible with certainty to prevent a failure such as heat-deterioration of the electric storage element 11 in the package 14 by heat which enters the package 14 during reflow soldering, and significant reduction of electrical properties of the electric double-layer capacitor or the like.

Further, with the underside of the thermal insulation material 16 being in contact with the substrate SU during reflow soldering, as shown in FIG. 5, a portion of the thermal insulation material 16 which is in contact with the substrate SU is not directly exposed to the furnace atmosphere in the reflow furnace, therefore the amount of heat transferred from the underside of the thermal insulation material 16 to the package 14 can be effectively reduced.

Accordingly, the electric double-layer capacitor 10-1 which is compatible with high-temperature reflow soldering using lead-free solder can be provided, thereby meeting the need for mounting the electric double-layer capacitor 10-1 on a substrate or the like with high-temperature reflow soldering using lead-free solder, in the same manner as general electronic components are mounted.

Embodiment 2

Figure 6:
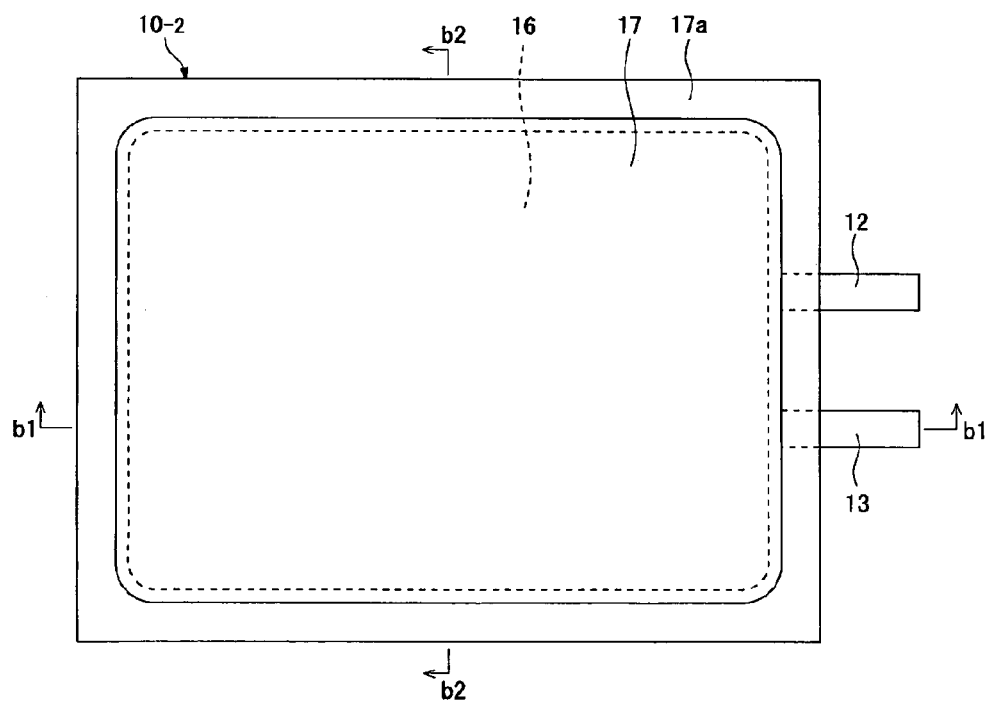
FIG. 6 is a top view of an electric double-layer capacitor in a second embodiment in which the present invention is applied to the electric double-layer capacitor.
Figure 7:
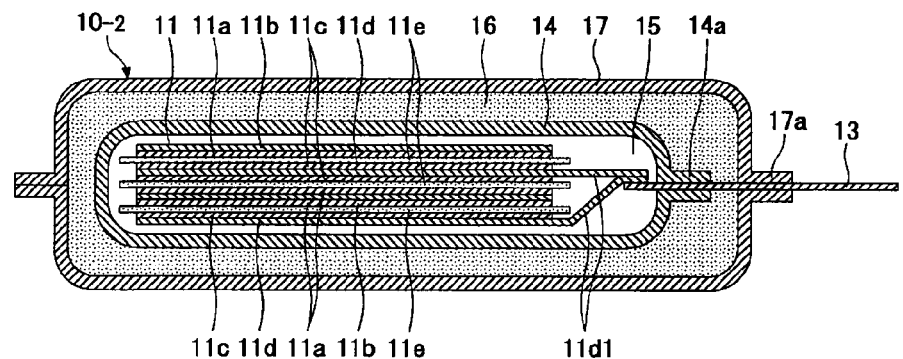
FIG. 7 is a longitudinal sectional view taken along the line b1-b1 of FIG. 6.
Figure 8:
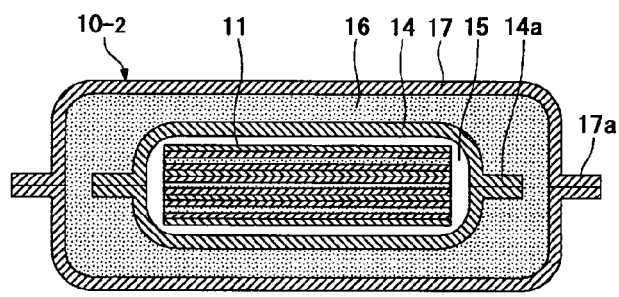
FIG. 8 is a longitudinal sectional view taken along the line b2-b2 of FIG. 6.
Figure 9:
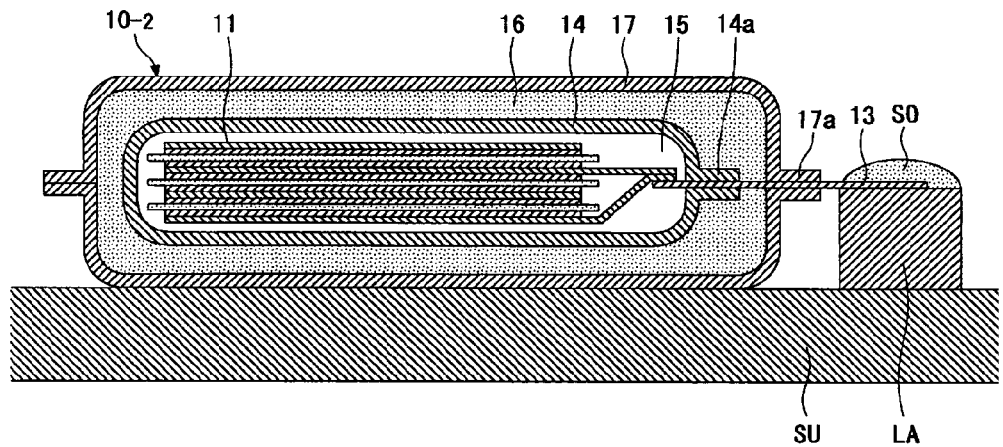
FIG. 9 shows a packaging structure in which the electric double-layer capacitor illustrated in FIGS. 6 to 8 is mounted on a substrate.

FIGS. 6 to 9 show a second embodiment in which the present invention is applied to an electric double-layer capacitor. FIG. 6 shows a top view of the electric double-layer capacitor; FIG. 7 shows a longitudinal sectional view taken along the line b1-b1 of FIG. 6; FIG. 8 shows a longitudinal sectional view taken along the line b2-b2 of FIG. 6; and FIG. 9 shows a packaging structure in which the electric double-layer capacitor illustrated in FIGS. 6 to 8 is mounted on a substrate.

An electric double-layer capacitor 10-2 of the second embodiment differs from the electric double-layer capacitor 10-1 of the first embodiment in that the entire thermal insulation material layer 16 is covered by a cover sheet 17. The remaining configurations are the same as those of the electric double-layer capacitor 10-1 of the first embodiment, therefore the same numerals are used to avoid duplication of description.

The cover sheet 17 is made of a sheet material having heat resistance to prevent changes in properties or the like when directly exposed to the furnace atmosphere in the reflow furnace during reflow soldering and heated to a specific temperature (for example, approximately 250° C.). As can be seen in FIG. 7, the cover sheet 17 covers the entire thermal insulation material layer 16 and the bases of the portions of the positive terminal 12 and the negative terminal 13 extending from the thermal insulation material layer 16, with the tips of the positive terminal 12 and the negative terminal 13 extending from the cover sheet 17 to the outside.

As a sheet material for forming the cover sheet 17, for example, (E41) a sheet material made of a plastic such as fluororesin, (E42) a sheet material including a layer made of a plastic such as fluororesin and an adhesive layer made of an adhesive in sequence and so on may be preferably used.

Further, as a method of forming the cover sheet 17 from the sheet material described in the above (E41), for example, (E51) a method of overlaying two sheets of rectangular sheet material of a predetermined size, and then joining the four sides thereof using the adhesive (see FIG. 6 and joined portion 17a), (E52) a method of bending and folding over a sheet of rectangular sheet material of a predetermined size, and then joining the three sides thereof using the adhesive and so on may be preferably used. Further, as a method of forming the cover sheet 17 from the sheet material described in the above (E42), for example, (E53) a method of overlaying two sheets of rectangular sheet material of a predetermined size to be adhered on the surfaces of the thermal insulation material layer 16 using the adhesive layer (the adhesive), and then joining the four sides thereof (at the overlaid portion of the adhesive layer) (see FIG. 6 and a joined portion 17a), (E54) a method of bending and folding over a sheet of rectangular sheet material of a predetermined size to be adhered on the surfaces of the thermal insulation material layer 16 using the adhesive layer (the adhesive), and then joining the three sides thereof (at the overlaid portion of the adhesive layer) and so on may be preferably used.

The cover sheet 17 is advantageous especially when the above described forming methods (E32) and (E33) are adopted among the methods of forming the thermal insulation material layer 16 as described in the first embodiment. That is, when a sheet-shaped material is used as in the forming methods (E32) and (E33), the sheet-shaped material may be pressed down by the cover sheet 17, therefore in the forming method (E32), a process of joining the wound end portions of the sheet-shaped material using an adhesive or the like can be eliminated, and in the forming method (E33), a process of adhering the sheet-shaped material on the surface of the package 14 using an adhesive can be eliminated.

Moreover, when the cover sheet 17 is formed by the above described forming methods (E51) and (E52), that is, the cover sheet 17 is not adhered on the surface of the thermal insulation material layer 16 using adhesive, a gap between the cover sheet 17 and the thermal insulation material layer 16 serves as an air layer which can perform the thermal insulation effect, therefore heat transfer to the package 14 can be effectively reduced due to a combination of the thermal insulation effect by the air layer and the thermal insulation effect by the thermal insulation material layer 16.

Further, the cover sheet 17 has an advantage in that a product number or the like can be easily printed on the surface thereof. That is, when the thermal insulation material layer 16 used is not suitable to be printed due to unevenness of its surface, a desired printing on the cover sheet 17 can be carried out by using the cover sheet 17.

Other advantages obtained from the electric double-layer capacitor 10-2 in the second embodiment are the same as those obtained from the electric double-layer capacitor 10-1 in the first embodiment, and will not be described herein.

Embodiment 3

Figure 10:
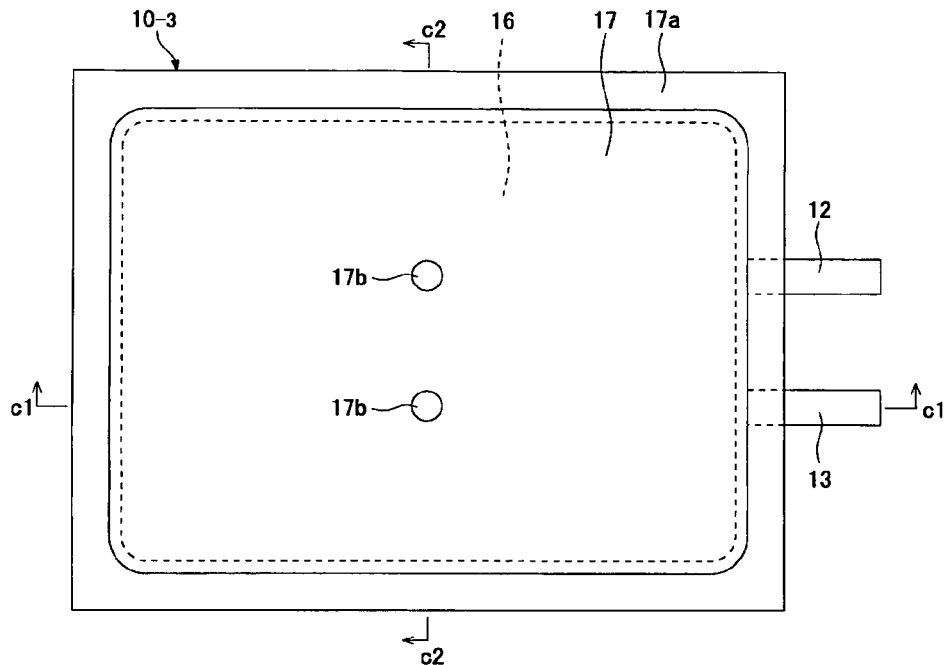
FIG. 10 is a top view of an electric double-layer capacitor in a third embodiment in which the present invention is applied to the electric double-layer capacitor.
Figure 11:
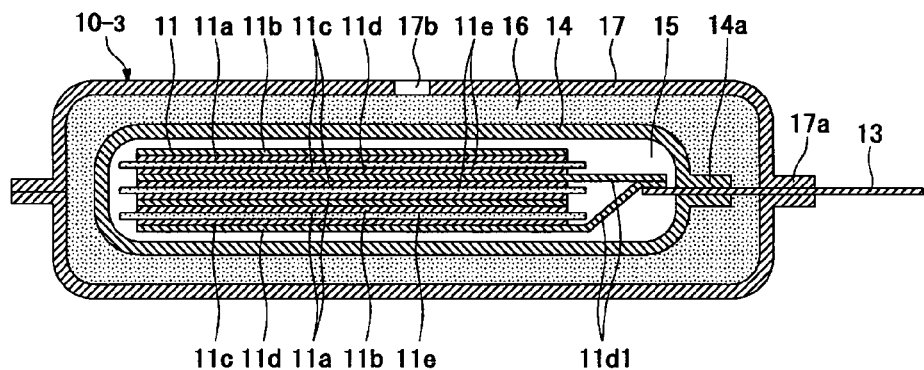
FIG. 11 is a longitudinal sectional view taken along the line c1-c1 of FIG. 10.
Figure 12:
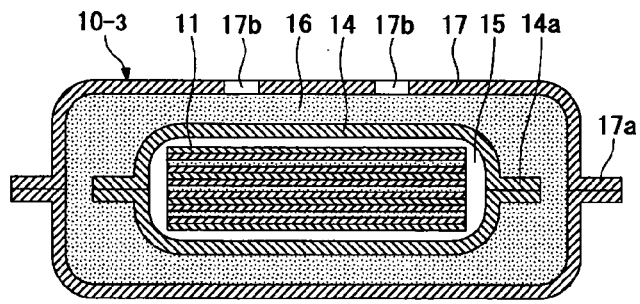
FIG. 12 is a longitudinal sectional view taken along the line c2-c2 of FIG. 10.
Figure 13:
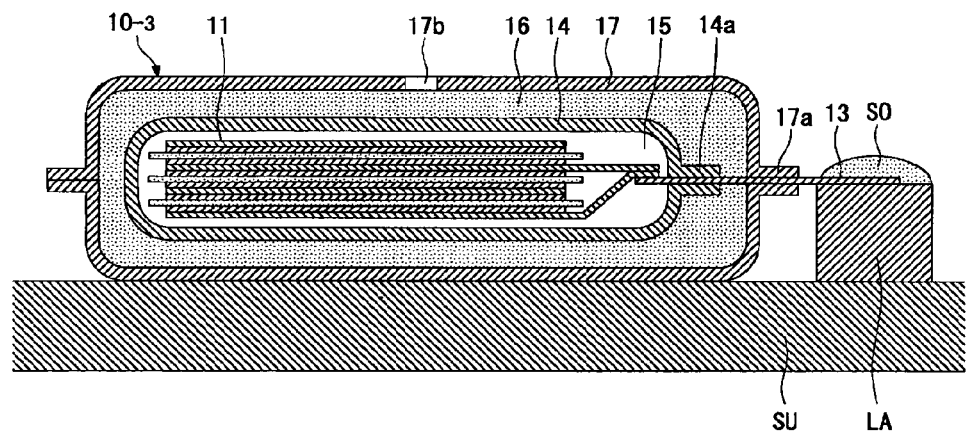
FIG. 13 shows a packaging structure in which the electric double-layer capacitor illustrated in FIGS. 10 to 12 is mounted on a substrate.

FIGS. 10 to 13 show a third embodiment in which the present invention is applied to an electric double-layer capacitor. FIG. 10 shows a top view of the electric double-layer capacitor; FIG. 11 shows a longitudinal sectional view taken along the line c1-c1 of FIG. 10; FIG. 12 shows a longitudinal sectional view taken along the line c2-c2 of FIG. 10; and FIG. 13 shows a packaging structure in which the electric double-layer capacitor illustrated in FIGS. 10 to 12 is mounted on a substrate.

An electric double-layer capacitor 10-3 of the third embodiment differs from the electric double-layer capacitor 10-2 of the second embodiment in that an air discharge hole 17b is formed on the cover sheet 17. The remaining configurations are the same as those of the electric double-layer capacitor 10-2 of the second embodiment, therefore the same numerals are used to avoid duplication of description.

The air discharge hole 17b serves to provide communication between the outside and inside of the cover sheet 17. In the figure, two circular air discharge holes 17b are provided on the top of the cover sheet 17 at an approximate center thereof. However, the air discharge hole 17b may be of a shape other than circular and the number of the air discharge hole 17b may be one, or alternatively, three or more. Further, the air discharge hole 17b may be formed at a position offset from the center on the top or other than the top of the cover sheet 17.

The air discharge hole 17b works effectively in the situation where air in the cover sheet 17 expands by heat during reflow soldering, thereby causing the cover sheet 17 to expand. That is, when the cover sheet 17 expands during reflow soldering, the expansion may cause a failure such as displacement of the electric double-layer capacitor 10-3, lift up of the tips of the positive terminal 12 and the negative terminal 13 away from the lands LA, or the like. However, when the air discharge hole 17b is formed, such a failure can be avoided by discharging air from the air discharge hole 17b so as to prevent expansion. In addition, when air in the cover sheet 17 deflates during cooling, deformation of the cover sheet 17 can also be avoided.

Other advantages obtained from the electric double-layer capacitor 10-3 in the third embodiment are the same as those obtained from the electric double-layer capacitor 10-2 in the second embodiment, and will not be described herein.

Embodiment 4

Figure 14:
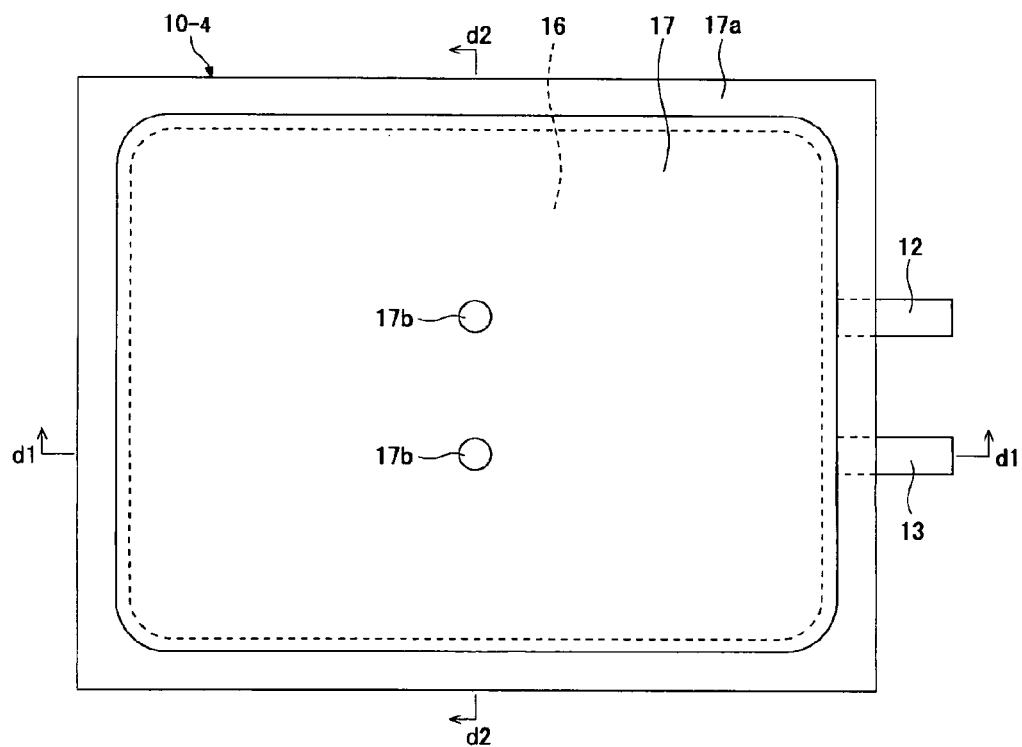
FIG. 14 is a top view of an electric double-layer capacitor in a fourth embodiment in which the present invention is applied to the electric double-layer capacitor.
Figure 15:
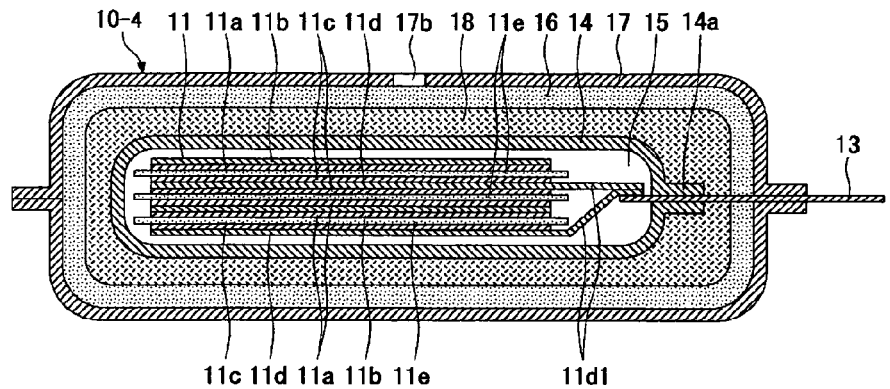
FIG. 15 is a longitudinal sectional view taken along the line d1-d1 of FIG. 14.
Figure 16:
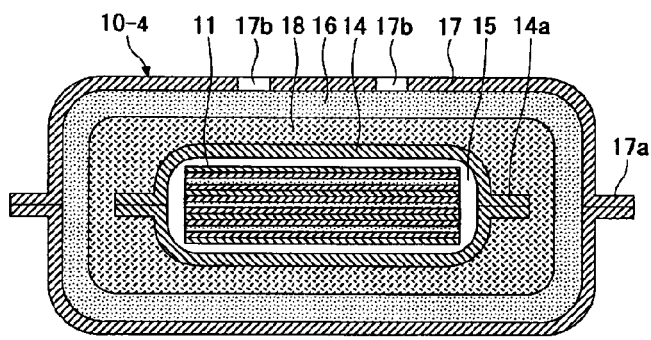
FIG. 16 is a longitudinal sectional view taken along the line d2-d2 of FIG. 14.
Figure 17:
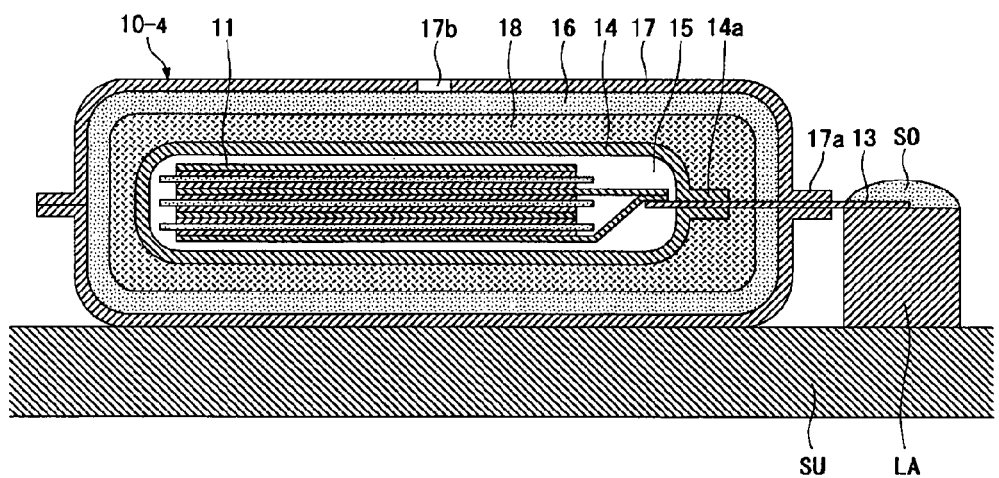
FIG. 17 shows a packaging structure in which the electric double-layer capacitor illustrated in FIGS. 14 to 16 is mounted on a substrate.

FIGS. 14 to 17 show a fourth embodiment in which the present invention is applied to an electric double-layer capacitor. FIG. 14 shows a top view of the electric double-layer capacitor; FIG. 15 shows a longitudinal sectional view taken along the line d1-d1 of FIG. 14; FIG. 16 shows a longitudinal sectional view taken along the line d2-d2 of FIG. 14; and FIG. 17 shows a packaging structure in which the electric double-layer capacitor illustrated in FIGS. 14 to 16 is mounted on a substrate.

An electric double-layer capacitor 10-4 of the fourth embodiment differs from the electric double-layer capacitor 10-3 of the third embodiment in that a deformation-suppressing member 18 is interposed between the thermal insulation material layer 16 and the package 14 while being covered by the thermal insulation material layer 16. The remaining configurations are the same as those of the electric double-layer capacitor 10-3 of the third embodiment; therefore the same numerals are used to avoid duplication of description.

The deformation-suppressing member 18 is formed of a material having a rigidity higher than that of the package 14. As can be seen in FIG. 15, the deformation-suppressing member 18 covers the entire package 14 and the bases of the led-out portions of the positive terminal 12 and the negative terminal 13, and the deformation-suppressing member 18 is in close contact with the surface of the package 14 and the surface of the bases of the led-out portions of the positive terminal 12 and the negative terminal 13.

As a material for forming the deformation-suppressing member 18, for example, (E61) ceramics such as alumina, (E62) a metal which surface is treated by insulation processing, especially a metal such as alloy or quenched aluminum, (E63) a plastic such as epoxy resin, aramid resin, polyimide resin, (E64) the above mentioned plastics blended with rigid filler and so on may be preferably used. Of course, other materials can be used as long as they have the above mentioned rigidity.

Further, as a method of forming the deformation-suppressing member 18 so as to cover the entire package 14 and the bases of led-out portions of the positive terminal 12 and the negative terminal 13, for example, (E71) a method of providing a mold having a rectangular cavity (not shown in the figure), inserting the package 14 into the cavity with the tips of led-out portions of the positive terminal 12 and the negative terminal 13 extending therein, injecting a flowable material into the cavity and curing the material, and removing the package 14 from the mold after curing, (E72) a method of providing two halves of the block preformed to have a recess on the inner surface thereof so as to conform with the outer profile of the package 14, and joining the halves together with the package 14 being placed therebetween and so on, may be preferably used.

During reflow soldering, when heat transfers through the cover sheet 17, the thermal insulation material layer 16, the deformation-suppressing member 18, and into the package 14, the deformation-suppressing member 18 works effectively to prevent heat expansion and deformation of the package 14. That is, when heat during reflow soldering transfers to the package 14, even in the situation where heat expansion and deformation in the package 14 may cause a failure such as leaking of the electrolyte solution 15, damage of the package 14 or the like, the deformation-suppressing member 18 can diminish the heat expansion and deformation, thereby preventing a failure with certainty.

Other advantages obtained from the electric double-layer capacitor 10-4 in the fourth embodiment are the same as those obtained from the electric double-layer capacitor 10-3 in the third embodiment, and will not be described herein.

Embodiment 5

Figure 18:
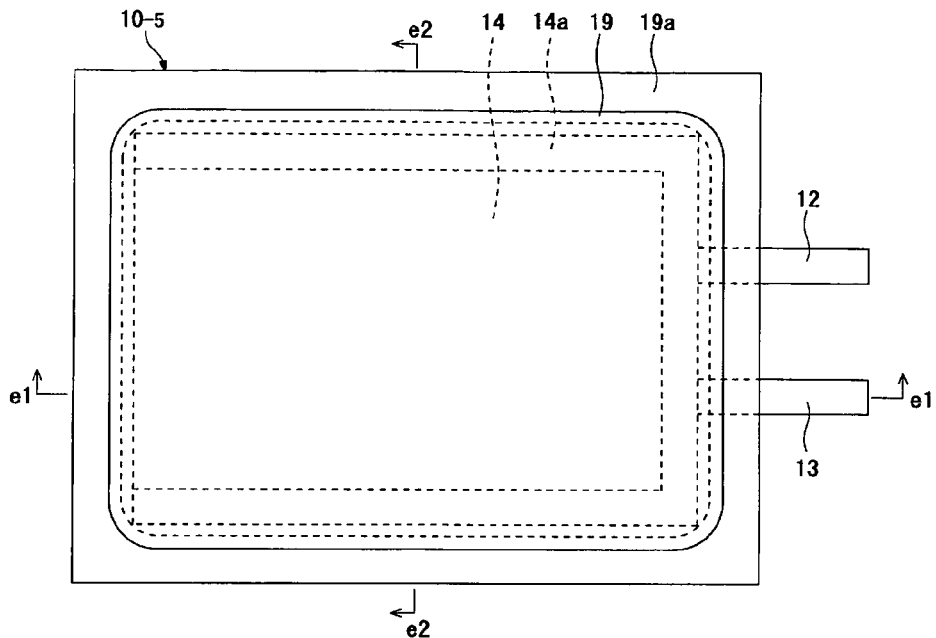
FIG. 18 is a top view of an electric double-layer capacitor in a fifth embodiment in which the present invention is applied to the electric double-layer capacitor.
Figure 19:
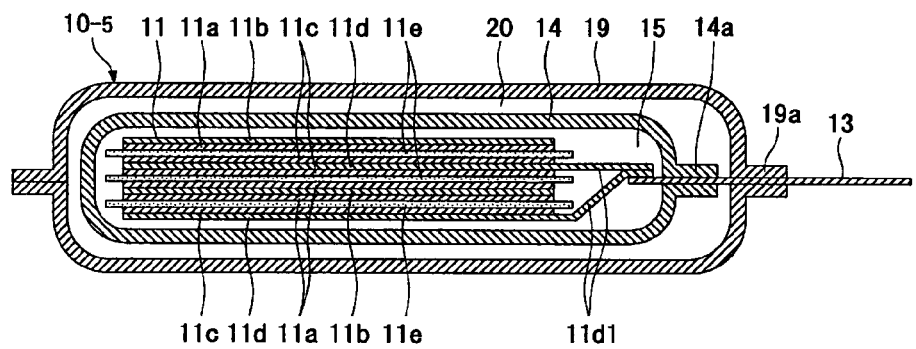
FIG. 19 is a longitudinal sectional view taken along the line e1-e1 of FIG. 18.
Figure 20:
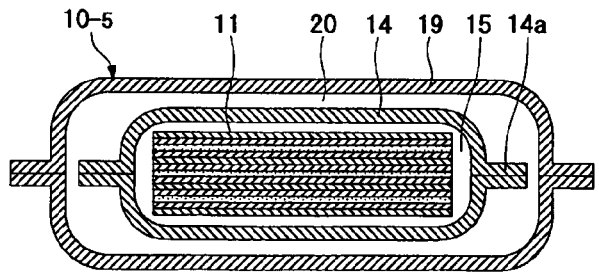
FIG. 20 is a longitudinal sectional view taken along the line e2-e2 of FIG. 18.
Figure 21:
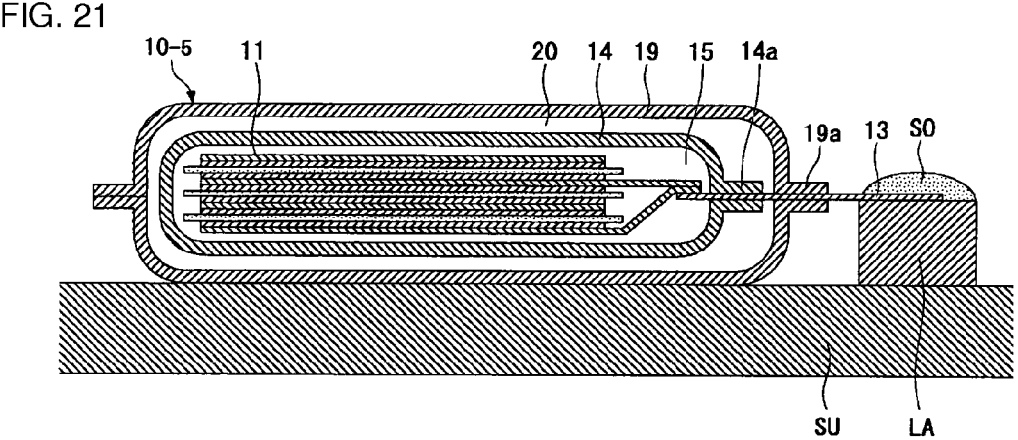
FIG. 21 shows a packaging structure in which the electric double-layer capacitor illustrated in FIGS. 18 to 20 is mounted on a substrate.

FIGS. 18 to 21 show a fifth embodiment in which the present invention is applied to an electric double-layer capacitor. FIG. 18 shows a top view of the electric double-layer capacitor; FIG. 19 shows a longitudinal sectional view taken along the line e1-e1 of FIG. 18; FIG. 20 shows a longitudinal sectional view taken along the line e2-e2 of FIG. 18; and FIG. 21 shows a packaging structure in which the electric double-layer capacitor illustrated in FIGS. 18 to 20 is mounted on a substrate.

An electric double-layer capacitor 10-5 of the fifth embodiment differs from the electric double-layer capacitor 10-1 of the first embodiment in that the thermal insulation material layer 16 is eliminated, and that a cover sheet 19 covers the entire package 14, thereby providing an air layer 20 between the cover sheet 19 and the package 14. The remaining configurations are the same as those of the electric double-layer capacitor 10-1 of the first embodiment, therefore the same numerals are used to avoid duplication of description.

The cover sheet 19 is made of a sheet material having heat resistance to prevent changes in properties or the like when directly exposed to the furnace atmosphere in the reflow furnace during reflow soldering and heated to a specific temperature (for example, approximately 250° C.). As can be seen in FIG. 19, the cover sheet 19 covers the entire package 14 and the bases of led-out portions of the positive terminal 12 and the negative terminal 13, the air layer 20 is interposed between the cover sheet 19 and the package 14, and the tips of the positive terminal 12 and the negative terminal 13 are extending from the cover sheet 19 to the outside.

As a material for forming the cover sheet 19, for example, (E81) a sheet material made of a plastic such as fluororesin and so on, may be preferably used.

Further, as a method of forming the cover sheet 19 from the sheet material described in the above (E81), for example, (E91) a method of overlaying two sheets of rectangular sheet material of a predetermined size, and then joining the four sides thereof using an adhesive (see FIG. 18 and joined portion 19a), (E92) a method of bending and folding over a sheet of rectangular sheet material of a predetermined size, and then joining the three sides thereof using an adhesive and so on, may be preferably used.

As a method of forming the air layer 20, for example, (E101) a method of actively insufflating air into the cover sheet 19 during formation of the cover sheet, (E102) a method of placing an appropriate number of rod shaped spacers or spherical shaped spacers for forming an air layer on the surface of the package 14 prior to forming the cover sheet 19 and forming the cover sheet 19 in a manner surrounding the rod shaped spacers or spherical shaped spacers and so on, may be preferably used.

The air layer 20 performs the thermal insulation effect which is the same as that of the thermal insulation material layer 16. That is, the cover sheet 19 is directly exposed to the furnace atmosphere in the reflow furnace in the course of passing through the reflow furnace and heated to a specific temperature (for example, approximately 250° C.), however, the heat conduction to the package 14 is suppressed due to the thermal insulation effect of the air layer 20 which covers the entire package 14, resulting in the amount of heat which flows into the package 14 being reduced. Also, since the air layer 20 covers the bases of led-out portions of the positive terminal 12 and the negative terminal 13, the amount of heat which flows through the positive terminal 12 and the negative terminal 13 into the package 14 is further reduced to some extent. Therefore, this makes it possible with certainty to prevent a failure such as heat-deterioration of the electric storage element 11 in the package 14 by heat which enters the package 14 during reflow soldering, and significant reduction of electrical properties of the electric double-layer capacitor or the like.

Other advantages obtained from the electric double-layer capacitor 10-5 in the fifth embodiment are the same as those obtained from the electric double-layer capacitor 10-1 in the first embodiment, and will not be described herein.

Other Embodiments (1) In embodiments 1 to 5, the thermal insulation material layer 16 (embodiments 1 to 4) which covers the entire package 14 and the air layer 20 (embodiment 5) which covers the entire package 14 have been described as elements for suppressing heat transfer from the outside to the package 14 (heat transfer suppressing means). However, the thermal insulation material layer 16 and the air layer 20 may be replaced by other elements as long as they have the same thermal insulation effect as that of the thermal insulation material layer 16 and the air layer 20.

(2) In embodiments 1 to 5, the electric double-layer capacitors 10-1 to 10-5 have been described as the layered type; however, the same advantages can be achieved when the present invention is applied to the electric double-layer capacitors of the button type or the wound type.

(3) In embodiments 1 to 5, the present invention has been applied to the electric double-layer capacitors 10-1 to 10-5 by way of example, however the same advantages can be achieved when the present invention is applied to any other electrochemical device having a similar package, for example, a lithium ion capacitor, redox capacitor, lithium ion battery or the like.

The invention claimed is:

1. An electrochemical device which is mounted by soldering for use, comprising: a package; an electric storage element which is sealed into the package; at least a pair of terminals, each having one end which is electrically connected to the electric storage element and another end which is led out of the package; and heat transfer suppressing means which covers the entire package and bases of led-out portions of the terminals so as to suppress heat transfer from the outside to the package, wherein the heat transfer suppressing means includes a cover sheet which covers the package, and an air layer which is disposed between the cover sheet and the package and configured to cover the entire surface of the package.

2. The electrochemical device according to claim 1, further comprising a deformation-suppressing member which is interposed between the package and the air layer while being covered by the air layer, wherein the deformation-suppressing member has a rigidity higher than that of the package, and covers the package and the bases of led-out portions of the terminals.

3. The electrochemical device according to claim 1, wherein the air layer covers the bases of led-out portions of the terminals.

4. The electrochemical device according to claim 1, which is an electric double-layer capacitor.

5. The electrochemical device according to claim 1, wherein the air layer is a closed layer containing air.

6. A packaging structure for an electrochemical device comprising:

a substrate which has a land formed on the surface thereof; and an electrochemical device according to claim 1 which is mounted on the substrate, wherein tips of led-out portions of the terminals are connected to the land using a solder.

7. The packaging structure according to claim 6, wherein the tips of led-out portions of the terminals are connected to the land using solder by reflow soldering.

* * * * *